United States Patent Office 3,531,737
Patented Sept. 29, 1970

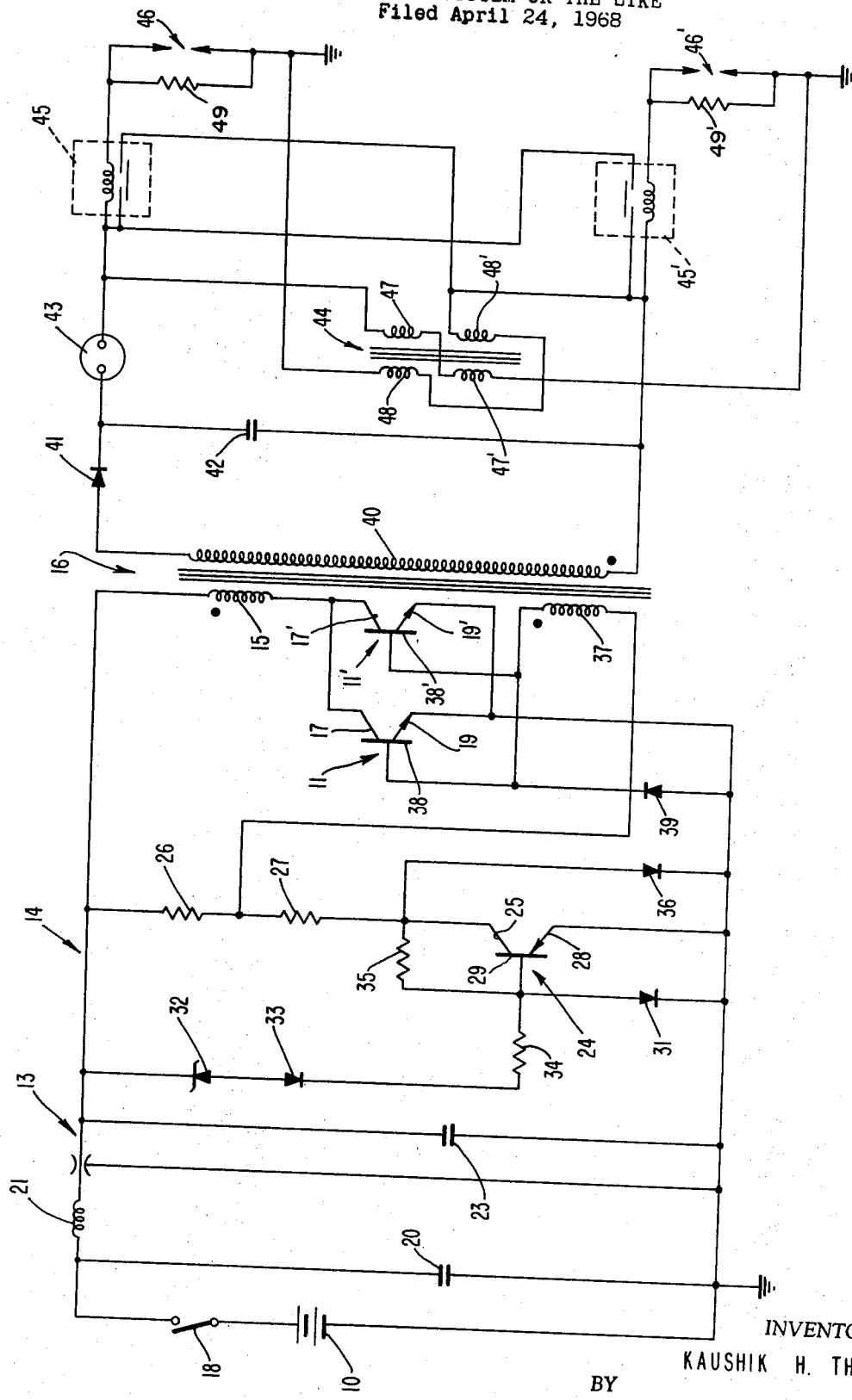

3,531,737
REGULATED POWER INVERTER CIRCUIT FOR IGNITION SYSTEM OR THE LIKE
Kaushik H. Thakore, Sidney, N.Y., assignor to The Bendix Corporation, a corporation of Delaware
Filed Apr. 24, 1968, Ser. No. 723,727
Int. Cl. H03k 3/30
U.S. Cl. 331—109          21 Claims

ABSTRACT OF THE DISCLOSURE

Inverter circuit adapted for use as the energizing source for loads such as an ignition circuit, and an ignition circuit powered by such inverter circuit. The inverter circuit is powered by a direct current source, and includes a transformer having inductively coupled primary, secondary, and tertiary or control windings. The inverter circuit includes a transistor, the collector-emitter terminals of which, in series with the primary winding of the transformer, are connected across the terminals of the power source, the primary winding being cyclically energized and de-energized as the transistor alternately becomes conductive and non-conductive upon variation of the base bias of the transistor. Energy is drawn from the current source and stored in the transformer primary during the conduction period of the transistor. Following this, the polarity of the voltage induced in the secondary and tertiary windings reverses, thereby driving the transistor into its non-conductive state. Energy is transferred to the load during the non-conduction period of the transistor. The load circuit includes a diode which open circuits the secondary during the periods of conduction of the transistor. The circuit includes power regulator means which maintains the output power constant despite wide variations in the voltage of the power source.

---

This application is related to application Ser. No. 723,-740 of the same inventor and assigned to the same assignee, which was filed concurrently herewith on Apr. 24, 1968.

The invention has among its objects the provision of a novel solid state inverter circuit.

Another object of the invention is the provision of an improved inverter circuit adapted to power a continuous duty ignition circuit.

Yet another object of the invention is the provision of an ignition circuit having a substantially constant rate of spark production over a wide range of variation of the voltage of the power source for the circuit.

A further object of the invention is the provision, in the inverter circuit, of power regulator means which maintains both the input and the output power constant despite wide variations in the voltage of the power source.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

The single figure of the drawing is a circuit diagram of an illustrative embodiment of oscillator circuit in accordance with the invention, such oscillator being shown connected to a dual ignition circuit.

In the illustrative embodiment, a novel inverter or oscillator circuit contemplated by the invention is shown as the supply or energizing source for an ignition circuit for jet type engines or the like. It will be apparent, however, that the pulse generating circuit of the invention may be utilized for supplying electrical power or energy to other types of loads.

Turning now to the drawing, there is there shown a so-called ringing choke inverter circuit powered by a battery 10 or other direct current source, the output voltage of which may vary, by way of example, as in the case of commonly used batteries between 9 and 30 volts. In the circuit shown there are provided an RFI filter, generally designated 13, and a power regulator, generally designated 14, which are interposed in that order between the power source 10 and two transistors 11, 11' connected in parallel in the common emitter mode and functioning as the switching element in the inverter circuit. The transistors 11, 11' which are the NPN type, have their collectors 17, 17' connected in parallel and to a first end of the primary winding 15 of a transformer 16, the second end of the primary winding 15 being connected to the high voltage side of the power source 10 through the above-mentioned RFI filter 13 and a suitable switch 18. The transformer 16 has additionally a secondary winding 40 and a tertiary or control winding 37, the windings 15, 37, and 40 being inductively coupled and wound and disposed in the manner indicated by the dots. The emitter terminals 19, 19' of the transistors 11, 11' are connected in parallel and to the grounded low tension terminal of the battery 10, as shown.

The RFI filter 13, which is of conventional design, includes a choke coil 21 in the high voltage line and condensers 20 and 23 which are connected across the high voltage line on opposite sides of the choke coil to the grounded low voltage side of the current source.

The base terminals 38, 38' of the transistors 11, 11' are connected in parallel and to a first end of the tertiary or control winding 37 of the transformer 16. The second end of the tertiary winding 37 is connected to the first ends of series connected resistors 26 and 27. The second end of resistor 26 is connected to the high voltage line of the power source; the second end of the resistor 27 is connected to the power regulator 14 in the manner now to be described. The transistor 24 of such power regulator functions as a variable resistor in series with the resistor 27, and thus variably biases the bases 38, 38' of the transistors 11, 11'.

The power regulator 14 includes the transistor 24, which is of the PNP type and is connected in the common emitter mode. The collector terminal 25 of transistor 24 is connected to the second end of the resistor 27. The emitter 28 of transistor 24 is connected to the low voltage side of the current source 10, and the base terminal 29 of transistor 24 is connected to the high voltage side of the current source through a resistor 34, and reversely polarized diode 33 and Zener diode 32, in that order. Resistor 34 limits the flow of current through the Zener diode 32 and the base terminal of the transistor 24. The base terminal 29 is connected to the collector terminal 25 through a resistor 35, the base terminal also being connected to the low voltage side of the current source through a diode 31.

The collector terminal 25 of transistor 24 is connected to the low voltage side of the current source through a diode 36 which is polarized in the same direction as the diodes 31 and 33. The base terminals 38, 38' of transistors 11, 11' are connected to the low voltage side of the current source through a diode 39 which has its cathode connected to the base of the transistor.

The transformer 16 has a secondary winding 40 which is connected across a load which is illustrated as an untimed dual ignition circuit. The ignition circuit comprises a diode rectifier 41 in a first lead wire from the secondary winding 40 and a relatively large tank capacitor 42 which is connected across the ends of the secondary winding 40 beyond the diode 41. Beyond the junction between the diode 41 and the capacitor 42 in said first lead from the secondary winding 40 there is interposed a control spark gap 43. Beyond the gap 43 in said first lead wire of the secondary or load circuit there is connected a load-splitting transformer 44. Transformer 44 has two first windings 47, 47' which are series connected at their first ends, and two second windings 48, 48' which are series connected at their first ends. The series connected first and second windings are symmetrically connected between the opposite ends of the secondary winding 40 and ground. Similar ignition coils 45, 45' are connected to energize respective spark gaps 46, 46', the electrodes of which are bridged by resistors 49, 49'. Ignition coils 45, 45', which are of a conventional construction, have coils, the windings of which have both inductive and capacitative components.

The first lead wire from the secondary winding 40, beyond control gap 43, is connected to the first end of the winding of coil 45, the second end of such winding being connected to a first electrode of spark gap 46, the other electrode of which is grounded. The first side of the capacitor of coil 45 is connected to the first end of the winding thereof, the second side of such capacitor being connected to the second lead wire from secondary winding 40 and to the second end of coil 48' of transformer 44. The second lead wire from the second winding 40 is connected to the first end of the winding of coil 45', the second end of such winding being connected to a first electrode of spark gap 46', the other electrode of which is grounded. The first side of the capacitor of coil 45' is connected to the first end of the winding thereof, the second side of such capacitor being connected to the first end of the winding of coil 45.

The disclosed circuit functions as follows: The transistors 11, 11' which as noted are of the NPN type, are conductive when their base voltage exceeds the emitter voltage plus the $b$–$e$ voltage drop (.7 v.), and are non-conductive when the opposite occurs. The circuit parameters, that is, the values of the resistors 26 and 27, the resistances of primary winding 14 and tertiary winding 37, and the characteristics of diodes 36 and 39 are such that when the switch 18 is closed the transistors 11, 11' are conductive. Electrical energy drawn from the battery 10 is stored in the primary winding 15 of the transformer 16 during the "on" or conduction period of the transistors 11, 11'. As the conduction period begins, the transistors 11, 11' are driven into saturation, and a constant voltage appears across the primary 15 of the transformer 16. Because of the inductance of the transformer, the constant primary voltage thereof produces a linearly rising current in the primary 15, and such current in turn induces a constant voltage in the base or tertiary winding 37 and the secondary winding 40 of the transformer 16. Since the polarity of the voltage induced in the secondary winding 40 does not allow the rectifier 41 to conduct, such secondary winding 40 is open circuited. The base voltage of the transistors 11, 11' produces a constant base current that determines the maximum current flowing through the primary 15 of the transformer 16 and the collectors 17, 17' of the transistors 11, 11'.

Since the base current is constant during the conduction period of the transistors 11, 11', the linearly rising collector current will reach a value equal to $\beta \cdot I_b$. At this time the voltage induced in the primary 15 of the transformer 16 will drop to zero, since the collector current can not exceed $\beta \cdot I_b$. This drop in the voltage induced in the primary winding 15 starts a regeneration action which drives the transistors 11, 11' into the cut off region. As the current flowing through primary winding 15 drops, the polarity of the voltage induced in the secondary winding 40 of the transformer 16 is reversed, allowing the diode 41 to conduct and to supply energy to the tank capacitor 42 and to the load, which in this instance is made up of the transformers 44, 45, and 45', the spark gaps 46, 46', and the resistors 49, 49'. Thus electrical energy which is fed to the primary winding 15 during the conducting period of the transistors 11, 11' is transferred to the load circuit during the non-conducting period of the transistors 11, 11'.

As the current flowing through primary winding 15 drops, the voltage induced in the control or tertiary winding 37 is also reversed; such reversal of the voltage in winding 37 holds the transistors 11, 11' in their non-conducting condition. Such reverse voltage condition in winding 37 remains until the energy stored in the transformer 16 is transferred to the tank capacitor 42. The inverter circuit is thus restored to its initial condition, and its above described operating cycle is then repeated. The spark gaps 46, 46' discharge when the charge on capacitor 42 reaches a voltage high enough to cause the capacitor to discharge through control gap 43.

The output power of the inverter circuit depends upon the time ($T_{on}$) in the cycle during which the transistors 11, 11' are conductive. $T_{on}$, in turn, is dependent upon the value of the base resistor 27. The output power and the output voltage will vary according to the beta of the transistors 11, 11'. The power regulator 14 provides, in effect, a variable resistor the resistance of which increases as the input voltage increases, so as to maintain the base current $I_b$ of the transistors 11, 11' substantially constant.

In the ignition system shown it is desirable to keep the output power at the spark gaps 46, 46' constant, even though the voltage of power source 10 may vary widely, as, for example, from 9 to 30 volts. It is also desirable to keep the input power (i.e., the product of the input voltage and the input average current) constant, whereby to keep the power loss and the heat dissipation of the system to a minimum. In the ringing choke-inverter, if the pulse width ($T_{on}$) is varied inversely as the input voltage, that is, when the input voltage increases, the pulse width of the oscillator decreases, the total energy per pulse stored in the primary winding of the transformer remains constant and a constant energy per pulse, which is independent of the input voltage, is transferred to the output capacitor. The output power is proportional to the energy stored per pulse times the frequency.

In an ignition system such as that shown, the load configuration is such that the turn-off time of the inverter is always constant, since it is essentially determined by discharge circuit parameters. Thus, the output power of the inverter can be kept constant by varying the pulse width ($T_{on}$) as the input voltage increases. Since the energy stored in the primary winding is independent of the input voltage, input power requirements will also be constant.

As described above, if the pulse width ($T_{on}$) is varied inversely as a function of the input voltage, the energy stored in the primary of the transformer is independent of the input voltage. In the ringing choke inverter, the pulse width ($T_{on}$) can be varied inversely as a function of input voltage by increasing the value of the base resistance as the input voltage increases. The transistor 24 of the power regulator, when operated in the active region, acts as a variable resistor. By reverse biasing the base of transistor 24 as the input voltage increases, the collector current of such transistor will decrease from a high value to a lower value and the voltage across the transistor will increase, thus simulating a variable resistor the resistance of which increases as the input voltage increases.

As the resistance of the base circuit of the transistors 11, 11', i.e. the resistance of the power regulator 24, increases, the base circuit current $I_b$ decreases; this results in a low collector current and hence a lower circuit input current (average input current), thus keeping the input power almost constant. Since the energy stored in the primary winding of the transformer is independent of the input voltage and is constant, the output power also remains constant.

In order to compensate for the variations in the beta of different transistors 11 and 11' which may be employed, the tolerances on the tank capacitor 42, the control spark gap voltage, and temperature variations, a variable base resistor 27 can be used. Such resistor 27 can be adjusted to give the desired output power at the minimum input voltage. The power regulator then causes the input power and the output power to remain constant despite variations in the voltage of the power source 10.

In the disclosed circuit, the power regulator consists of the transistor 24, Zener diode 32, and resistors 35 and 34. The Zener diode voltage is selected to be equal to the minimum input voltage, so that transistor 24 almost saturates at the minimum input voltage. As the input voltage is increased the Zener-diode 32 conducts, and reverse biases the transistor 24 which results in a lower collector current and higher voltage across the transistor 24. The diode 31 clamps the base to emitter voltage of transistor 24 to a voltage which is appreciably less than the specified rating of such transistor, thus safeguarding the transistor from damage.

The circuit of the present invention displays numerous advantages over prior art circuits. It can be constructed with smaller electrical components than formerly, such smaller components being correspondingly less expensive. The circuit gives increased gap life both of the control gap and of the ignition gaps. The rate of production of sparks across the ignition gaps is nearly constant over a wide range of variation of the voltage of the current source. The circuit has constant input average currents and constant input peak currents, and the diodes employed in the circuits can be of low power capacity, which means lower cost and smaller physical size. The circuit may be employed with a standard radio frequency filter. The power output from the circuit, despite wide variations in input voltage, is held constant by the power regulator for a given base biasing resistor 27. Such power output may be additionally controlled by varying the value of resistor 27. This permits the circuit of the invention readily to be adapted to use with loads requiring different outputs.

Although only one embodiment of the invention has been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art. Thus although two transistors 11, 11′ connected in parallel are shown, it is to be understood that only one such transistor may be employed in circuits adapted for use with loads having smaller power requirements.

What is claimed is:

1. A pulse generating oscillator circuit adapted for energizing an intermittently discharged load circuit, said oscillator circuit comprising a transformer having inductively coupled primary, secondary, and tertiary windings, a source of direct current, an intermittently conductive and non-conductive transistor having a collector, an emitter, and a base, the collector-emitter terminals of the transistor being connected in series with the primary winding across the current source, the tertiary winding being connected between the base terminal of the transistor and a base biasing circuit connected across the current source, a rectifying means connected to the output of the secondary winding and between it and said load circuit so that said secondary winding is disconnected from the load when the transistor is conductive and is connected to the load when the transistor is non-conductive, the parts being so constructed and arranged that the transistor is driven into saturation as the conduction period thereof starts and a dropping of the induced voltage in the primary winding upon the attainment of a maximum by the collector current causes a regeneration action in the tertiary winding which drives the transistor into its non-conductive condition, and power regulating circuit means for sensing variations of the output voltage of said source and responsive to such variations independently of the magnitude of the voltage across said load circuit to decrease the maximum collector current of the transistor when such voltage increases and to increase the maximum collector current of the transistor when such voltage decreases, whereby to maintain the input power to the oscillator circuit substantially constant.

2. An oscillator circuit according to claim 1, wherein said power regulating circuit means includes variable resistance means interposed in the base circuit, the resistance of the variable resistance means increasing as the voltage of the current source increases, and decreasing as the voltage of the current source decreases.

3. An oscillator circuit according to claim 2, wherein the power regulating circuit means comprises a second transistor having collector, emitter, and base terminals, the collector and emitter terminals of the second transistor being connected in a circuit extending between the base terminal of the first transistor and the low voltage side of the power source, and means variably to bias the base terminal of the second transistor so that the voltage across its collector-emitter terminals increases when the voltage of the current source increases and decreases when the voltage of the current source decreases.

4. An oscillator circuit according to claim 3, wherein the means variably to bias the base terminal of the second transistor comprises a resistor and a Zener diode, connected in series, and connected between the high voltage side of the current source and the base terminal of the second transistor, the Zener diode having a breakdown voltage substantially equal to the minimum input voltage, whereby the second transistor almost saturates at the minimum input voltage, and as the input voltage is increased from said minimum the Zener diode conducts and reversely biases the second transistor.

5. An oscillator circuit according to claim 4, comprising a starting resistor connected between the high voltage side of the current source and the tertiary winding.

6. A pulse generating oscillator comprising a direct current source of electrical energy, a transistor having collector, emitter and base terminals, a transformer having inductively coupled primary, secondary and tertiary windings, said primary winding being connected in series with said collector and emitter terminals across said source, a transistor starting circuit comprising a first resistor connected in series with said tertiary winding and the base and emitter terminals across said source, a base circuit comprising said tertiary winding, a second resistor and a solid state conduction control device connected in series across the base to emitter junction of the transistor and a diode connected in shunt with said conduction control device and in series with said first resistor across said source, said diode and device being oppositely polarized, and means for varying the resistance of the conduction control device in response to variations in the output voltage of said source.

7. A pulse generating oscillator as defined in claim 6 wherein said conduction control device is a second transistor having base, emitter and collector terminals.

8. A pulse generating oscillator as defined in claim 7 wherein the base terminal of the second transistor is connected to the high potential terminal of said source through a Zener diode and second diode which are oppositely polarized and series connected whereby to reverse bias the base terminal of the second transistor in response to the voltage of said source and thereby vary the resistance of the emitter-collector junction of the second transistor in accordance with variations in the source voltage.

9. An inverter circuit comprising a direct current source of electrical energy, a transistor having collector, emitter and base terminals, a transformer having inductively coupled primary, secondary and tertiary windings, said primary winding being connected in series with said collector and emitter terminals across said source, a starting circuit comprising a starting resistor connected in series with said tertiary winding and said base and emitter terminals across said source, a base circuit comprising said tertiary winding connected in series with a solid state conduction control device across the base-to-emitter junction of said transistor, and means for varying the conductivity of said device in response to variations in the output voltage of said source.

10. An inverter circuit as defined in claim 9 wherein said conduction control device is a second transistor.

11. An inverter circuit as defined in claim 10 wherein the means for varying the conductivity of the second transistor comprises a Zener diode connected in series with the base-to-emitter junction of said second transistor across said source.

12. An inverter circuit as defined in claim 10 wherein said second transistor is of the PNP type having its emitter terminal connected to the emitter terminal of said first-named transistor and its collector terminal connected to the base terminal of said first-named transistor through said tertiary winding.

13. An inverter circuit as defined in claim 9 comprising a uni-directional conduction control device connected in parallel with said first-named conduction control device in said base circuit and in series with said starting resistor across said source.

14. An inverter circuit as defined in claim 9 comprising a fixed resistor in said base circuit which is substantially smaller than said starting resistor.

15. An inverter circuit comprising a direct current source of electrical energy, a transistor having collector, emitter and base terminals, a transformer having inductively coupled primary, secondary and tertiary windings, said primary winding being connected in series with said collector and emitter terminals across said source, a base circuit comprising said tertiary winding and variable resistance means connected in series across the base-to-emitter junction of said transistor, and means for sensing variations of the output voltage of said source and for varying the resistance of said resistance means in response to the variations thus sensed.

16. An inverter circuit as defined in claim 15, wherein said resistance means comprises a solid state conduction control device.

17. An inverter circuit as defined in claim 16, wherein said conduction control device is a second transistor having collector, emitter, and base terminals, the emitter-collector conductivity of which varies inversely to variations in said source voltage.

18. An inverter circuit as defined in claim 17, wherein the means for varying said resistance means comprises a Zener diode connected in series with the base-to-emitter junction of said second transistor.

19. An inverter circuit as defined in claim 18, wherein a voltage equal to the source voltage less the Zener diode threshold voltage is applied to the base terminal of said second transistor.

20. An inverter circuit comprising a direct current source of electrical energy, a transistor having collector, emitter and base terminals, a transformer having inductively coupled primary, secondary and tertiary windings, said primary winding being connected in series with said collector and emitter terminals across said source, a base circuit comprising a second transistor having collector, emitter and base terminals and said tertiary winding connected in series with the emitter-collector junction of said second transistor across the base-emitter junction of said first transistor, and means comprising a Zener diode connected in series with a resistor between said source and the base terminal of said second transistor for controlling the conductivity of the emitter-collector junction of the second transistor.

21. An inverter circuit as defined in claim 20, wherein said Zener diode has a breakdown voltage at which said second transistor almost saturates.

References Cited

UNITED STATES PATENTS

| | | | |
|---|---|---|---|
| 3,114,096 | 12/1963 | Projain | 331—109 X |
| 3,284,724 | 11/1966 | Marlow | 331—109 |
| 3,435,320 | 3/1969 | Lee et al. | 331—112 X |

ROY LAKE, Primary Examiner

S. H. GRIMM, Assistant Examiner

U.S. Cl. X.R.

307—297; 315—209; 321—2; 331—112, 176, 183